(12) United States Patent
Fludger

(10) Patent No.: US 9,379,771 B2
(45) Date of Patent: Jun. 28, 2016

(54) FIBER LENGTH MEASUREMENT SYSTEM

(71) Applicant: Cisco Technology, Inc., San Jose, CA (US)

(72) Inventor: Chris Fludger, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 454 days.

(21) Appl. No.: 13/926,736

(22) Filed: Jun. 25, 2013

(65) Prior Publication Data

US 2014/0376905 A1    Dec. 25, 2014

(51) Int. Cl.
H04B 3/00    (2006.01)
H04B 3/46    (2015.01)
H04B 10/073  (2013.01)
G01M 11/00   (2006.01)

(52) U.S. Cl.
CPC .......... H04B 3/46 (2013.01); G01M 11/31 (2013.01); H04B 10/073 (2013.01)

(58) Field of Classification Search
CPC ........ G01C 3/08; G01M 11/30; G01M 11/31; H04B 3/46; H04B 10/073
See application file for complete search history.

(56) References Cited

U.S. PATENT DOCUMENTS 4,766,549 A * 8/1988 Schweitzer et al. ............ 702/59
5,367,395 A * 11/1994 Yajima et al. .................. 398/17
5,801,818 A * 9/1998 Corrigan et al. ............ 356/5.01
6,396,575 B1 * 5/2002 Holland ........................ 356/73.1
7,808,623 B2   10/2010 Piciaccia et al.
2002/0149823 A1 * 10/2002 Bergano et al. ............... 359/156
2002/0180954 A1 * 12/2002 Qian et al. .................... 356/73.1
2003/0113118 A1 * 6/2003 Bartur .......................... 398/139
2005/0285058 A1 * 12/2005 Beller ....................... 250/559.38
2006/0012374 A1 * 1/2006 Kojovic et al. ............... 324/522
2007/0248020 A1 * 10/2007 Hoque et al. .................. 370/249
2007/0258721 A1 * 11/2007 Boduch et al. ................ 398/147
2009/0091737 A1 * 4/2009 Kim et al. .................... 356/5.01

OTHER PUBLICATIONS

J.C. Geyer et al., Channel Parameter Estimation for Polarization Diverse Coherent Receivers, IEEE Photonics Technology Letters, vol. 20, No. 10, 3pgs. May 15, 2008.

* cited by examiner

Primary Examiner — Luke Ratcliffe
Assistant Examiner — Hovhannes Baghdasaryan

(57) ABSTRACT

A system for measuring a length of one or more spans between a first optical transceiver and a second optical transceiver in a fiber-optic network, which can determine, at a processor associated with the first optical transceiver, a round-trip time of an optical signal communicated from the first optical transceiver to the second optical transceiver and back to the first optical transceiver. The system can also determine, at the processor, a half-round-trip time by dividing the round-trip time by two. The system can also determine, at the processor, a distance between the first and the second optical transceivers by multiplying the speed of light by the half-round-trip time.

18 Claims, 5 Drawing Sheets

FIBER LENGTH MEASUREMENT SYSTEM

FIELD

The present disclosure relates generally to fiber length measurement systems.

BACKGROUND

Fiber-optic communication systems have revolutionized the telecommunications industry. Optical fibers have largely replaced copper wire due to the advantages of fiber-optic communications over copper wire communications. Fiber-optic communication systems transmit information from one place to another by encoding data on light that is sent through an optical fiber. The light acts as a carrier wave that can be modulated to carry information. In order to implement fiber-optic communication, one node of a fiber-optic network generates an optical signal that is transmitted along optical fiber. Then another node of the fiber-optic network may receive the optical signal and convert the optical signal into an electrical signal. The generated optical signal may be derived from an electrical signal as well. Typically, along with optical fibers and control units, transceivers with the capability to convert an electrical signal to an optical signal (and vice versa) enable optical networks.

DESCRIPTION OF EXAMPLE EXAMPLES

Overview

Figure 1:
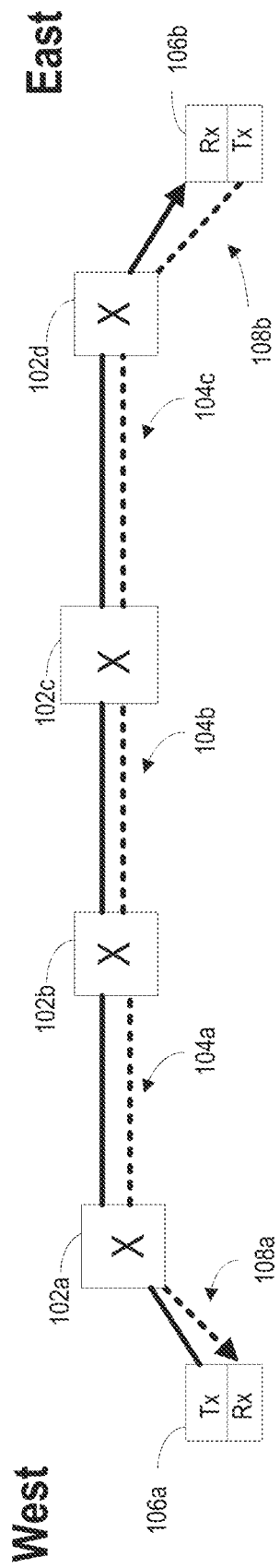
FIG. 1 illustrates a block diagram of example link architecture.

A system for measuring a length of one or more spans in a fiber-optic network, such as a fiber length measurement system (FLMS), can include multiple optical transceivers, a control module, and fiber optic cables connecting the transceivers. The control module may include a processor and memory that includes instructions executable by the processor to determine a round-trip time of an optical signal communicated from a first optical transceiver to a second optical transceiver and back to the first optical transceiver. The memory may also include instructions executable by the processor to determine a half-round-trip time by dividing the round-trip time by two and instructions executable by the processor to determine a distance between the first and the second optical transceivers by multiplying the speed of light by the half-round-trip time.

The instructions executable by the processor to determine the round-trip time may include instructions executable by the processor to set a first marker. These instructions may also include instructions executable by the processor to transmit the first marker from the first optical transceiver to the second optical transceiver, to start a timer upon the transmission of the first marker, and to stop the timer upon receipt of a second marker.

Additionally or alternatively, the memory may include instructions executable by the processor to determine a position of an anomaly in the fiber-optic network. These instructions may include instructions executable by the processor to determine a round-trip length based on the speed of light and the round-trip time. These instructions may also include instructions executable by the processor to synchronize local clocks of the first and the second optical transceivers. Also included may be instructions executable by the processor to record time of detection of the anomaly for each of the first and the second optical transceivers and to calculate the position of the anomaly with respect to a difference between the time of detection of the anomaly for each of the first and the second optical transceivers, the speed of light, and the round-trip length.

In one example of the system, determining a position of an anomaly in the fiber-optic network may include recording local clock time upon the detection of the anomaly for each of the first and the second optical transceivers, and determining the time of detection of the anomaly for each of the first and the second optical transceivers based on the local clock time for each of the first and the second optical transceivers.

Additionally or alternatively, instructions executable by the processor to determine the position of the anomaly may include instructions to determine a difference in time between a time of detection of the anomaly for each of the first and the second optical transceivers. Also, these instructions may include instructions executable by the processor to multiply the difference in time by the speed of light (resulting in a product), to add the product to the distance between the first and the second optical transceivers (resulting in a summation), and to divide the summation by two.

Additionally or alternatively, the memory may include instructions executable by the processor to fine-tune the determination of distance between the first and the second optical transceivers by reducing a frame size of a frame structure included in a communication between the first and the second optical transceivers.

Additionally or alternatively, the system may be implemented by an operation performed by a processor and possibly other components of one or more transponders. The operation includes processes for measuring a length of one or more spans in a fiber-optic network as well. The operation may include setting a first marker at a first transponder, transmitting the first marker to a second transponder via one or more spans, starting a timer at the first transponder, receiving a second marker at the first transponder (the second marker transmitted from the second transponder upon receiving the first marker by the second transponder), stopping the timer at the first transponder upon the receiving of the second marker, and determining a length of the one or more spans based on a time period defined by the starting to the stopping of the timer.

The operation may also include receiving data associated with an anomaly instead of the second marker. The anomaly may be one or more of a loss of signal, a loss of channel, or a loss of clock. The anomaly may also be one or more of an amplitude change, a polarization change, or a phase shift. The anomaly may also be associated with a perturbation in the one or more spans. The perturbation may be a break in a cable fiber and/or a power outage at a node in the one or more spans.

Example Embodiments

In one example, an optical transponder can include the FLMS. The example transponder may be or include a transceiver that can communicate at a high data rate (such as 100 or 500 Gbit/s). In such an example, the FLMS can determine a fiber length of a fiber-optic network and/or a position of an anomaly in the fiber-optic network via a control module (such as a network control plane). In determining the position of an anomaly, the control module can identify a fiber break and/or a bi-directional event, such as polarization changes. Such an identification can be based on information communicated to and from optical transceivers of the fiber-optic network. The optical transceivers may communicate via a fiber-optic communications channel. In one example, the detectable anomalies may be bidirectional in a cable of one or more spans or links of a fiber-optic network. Bidirectional anomalies may include unexpected polarization changes, such as changes due to mechanical vibration of the cable, or signal amplitude changes due to a break in the cable. The transponder and/or the FLMS can also determine optical signal-to-noise ratio, fiber chromatic dispersion, instantaneous differential group delay, polarization dependent loss, and/or polarization change rate. The determination of these parameters may be performed via channel parameter estimation techniques for polarization diverse coherent receivers. Also, these parameters together with the fiber length are useful metrics for characterizing physical fiber parameters associated with a fiber-optic network and can be used to estimate whether transmission performance is as expected or not.

Locating an anomaly in a fiber optic cable of a fiber-optic network, such as a cable break, may be based on identifying an anomaly in fiber-optic communications, such as a power loss, at a node of the network. In one example, the control module of the FLMS may estimate a location of a cable break by performing a reflectometry measurement at a neighboring node. A reflectometry measurement may include a measurement in a time or frequency domain. This can be done at each node of a span in a fiber-optic network. Also, this technique can be used to determine fiber length of the fiber-optic network, where the fiber-optic network includes one or more spans or links. Such measurements may require travelling and performing experiments at a node, or providing equipment for automated measurements at a node. Calculations of the FLMS may be performed by a control module, such as the network control plane 304 of FIG. 3, and may not require traveling.

FIG. 1 illustrates a block diagram of example link architecture. The architecture includes bidirectional nodes 102a, 102b, 102c, and 102d, such as bidirectional links, connected by fiber optic cables 104a, 104b, 104c, 108a, and 108b. Each of the cables represent a fiber span, which may include a span up to 150 km in length, for example. The cables may include at least two fibers. One fiber may carry data in one direction and another fiber may carry data an opposite direction. For example, a first fiber may carry data east to west and a second fiber may carry data west to east. One fiber may carry bi-directional data; however, including fibers that are dedicated to one direction limits noise in a signal carrying the data, such as signal reflections and Rayleigh backscatter. The nodes 102a, 102b, 102c, and 102d may consist of optical amplifiers and/or optical add-drop multiplexers. Nodes 106a and 106b link to respective bidirectional nodes 102a and 102d. The nodes 106a and 106b include respective transponders.

A transponder may include a device that emits an identifying signal in response to an interrogating received signal. The respective transponders may also include bidirectional transceivers and/or separate receivers and transmitters that can implement the FLMS and/or include the control module of the FLMS.

Figure 3:
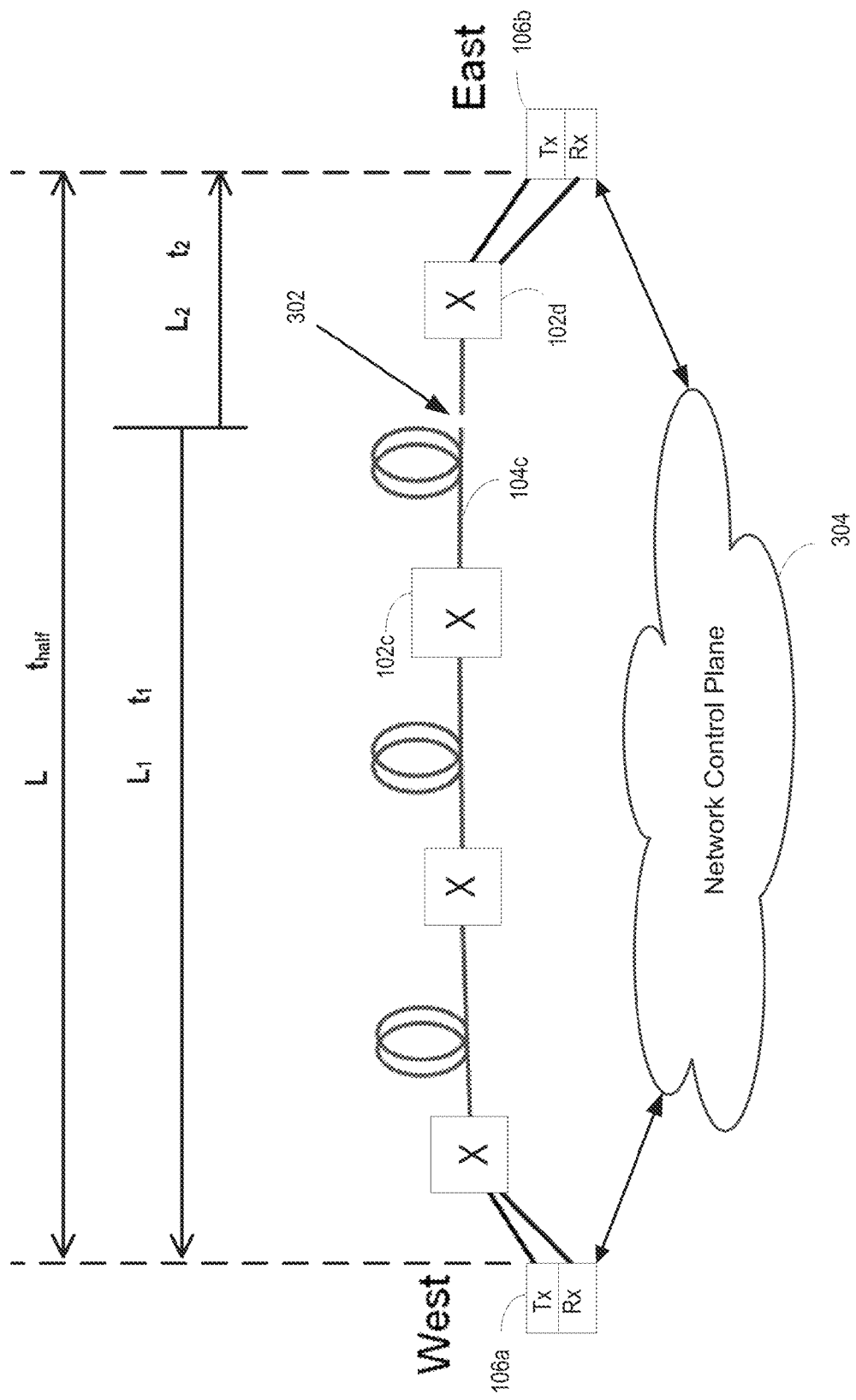
FIG. 3 illustrates another block diagram of the example link architecture depicted in FIG. 1.

In one example, the control module may be or include a control plane, such as control plane 304 illustrated in FIG. 3. The control plane may include one or more network devices that can implement the control module. At least one of the fiber optic cables 104a, 104b, and 104c may include fibers dedicated to communicating in different directions, such as east-to-west and west-to-east fibers. Where a fiber optic cable includes fibers dedicated to communicating in different directions, such as the east to west direction and the west to east direction, fiber length is half a total round trip length when measuring fiber length according to the time it takes for light to travel.

Transceivers, such as bidirectional transceivers included in the FLMS, may include and/or communicate according to a frame structure. The frame structure can map client data and communications data communicated via the fiber optic cables 104a, 104b, and 104c. The frame structure may include a data communications channel (DCC) to communicate service data, such as data to debug and/or diagnose client communications. Data transmitted over the DCC may be transmitted at a lower rate than data sent via client communications. The DCC may be a separate channel in the frame structure from a channel that communicates the client data. Also, the DCC may be a service channel that facilitates system communications during communications on client data. In such an example, the service channel may operate synchronously, asynchronously, serially, and/or in parallel to the channel communicating client data. Transceivers, such as the bidirectional transceivers of the FLMS, can communicate with one another and provide feedback to one another via the DCC. In one example, a frame of the frame structure may have a length of n, such as 500,000 bits, and the DCC may be included in an overhead, such as an overhead of 0.2% transmitted in every frame. For instance, at a 100 Gbit/s line rate, each frame may be 5 $\mu s$.

Figure 2:
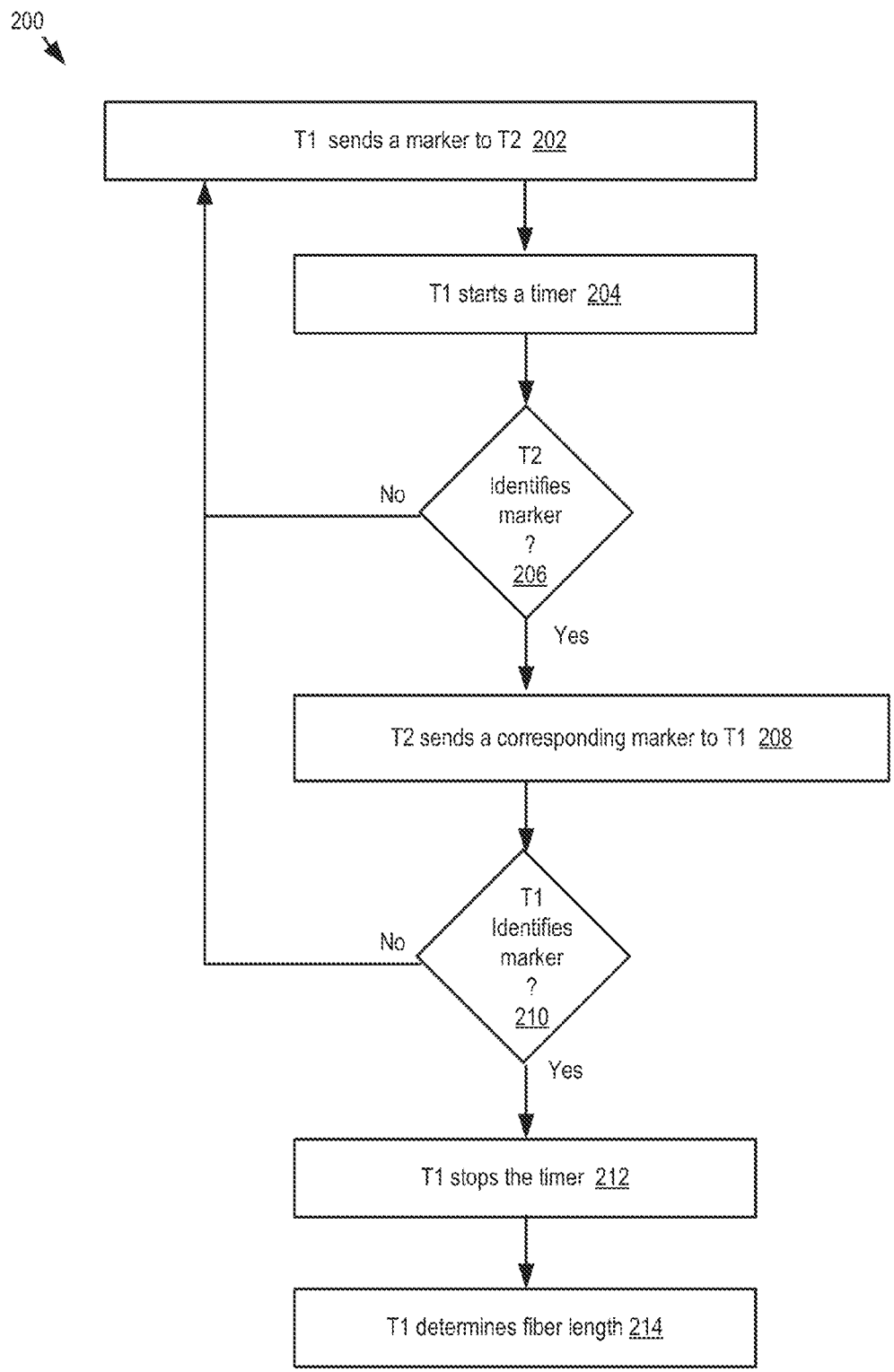
FIG. 2 illustrates a flow chart of an example operation for determining fiber length across one or more spans.

FIG. 2 illustrates a flow chart 200 of an example operation for determining fiber length across one or more spans of a fiber-optic network. At 202, a first transponder, such as a transponder of node 106a, sets a marker, such as a bit, and sends the marker via the DCC to a second transponder, such as a transponder of node 106b. Upon sending the marker, the first transponder starts a timer, at 204. At 206, the second transponder may receive and identify the marker via the DCC. Where the marker is identified at 206, the second transponder sets a corresponding marker, such as a corresponding bit, and sends the corresponding marker via the DCC to the first transponder at 208. At 210, the first transponder may receive and identify the corresponding marker via the DCC. Where the corresponding marker is identified at 210, the first transponder stops the timer at 212. A recorded time period from the starting to the stopping of the timer may be referred to as the round-trip time. At 214, the first transponder or another aspect of the FLMS, such as the control module, may determine the length of the fiber, such as the length of the one or more spans, based on time recorded from the starting to the stopping of the timer. For example, fiber length may be approximated by multiplying half of the recorded time by the speed of light. The accuracy of the fiber length measurement may be dependent on frame size. For example, where the frame size is 5 $\mu s$ there may be a 2 km inaccuracy in determining the length. But where a span is 1000 km, this inaccuracy is only a 2% disparity, which should be acceptable. Where greater accuracy is required, the frame size may be reduced.

At 206 or 210, where the marker or the corresponding marker is not identified or received, the first transponder may set another marker and start another timer. In one example, the timer may automatically timeout if first transponder does not receive the corresponding marker within a determined time period. Also, the first transponder may send another marker and start another timer automatically after the timeout.

FIG. 3 illustrates another block diagram of the example link architecture depicted in FIG. 1. Depicted is a break 302 in a bidirectional fiber optic cable 104c, between nodes 102c and 102d. $L_1$ is the length from the break to the node 106a, and $L_2$ is the length from the break to the node 106b. A cable break or another type of anomaly may disrupt an optical signal in both directions.

Figure 4:
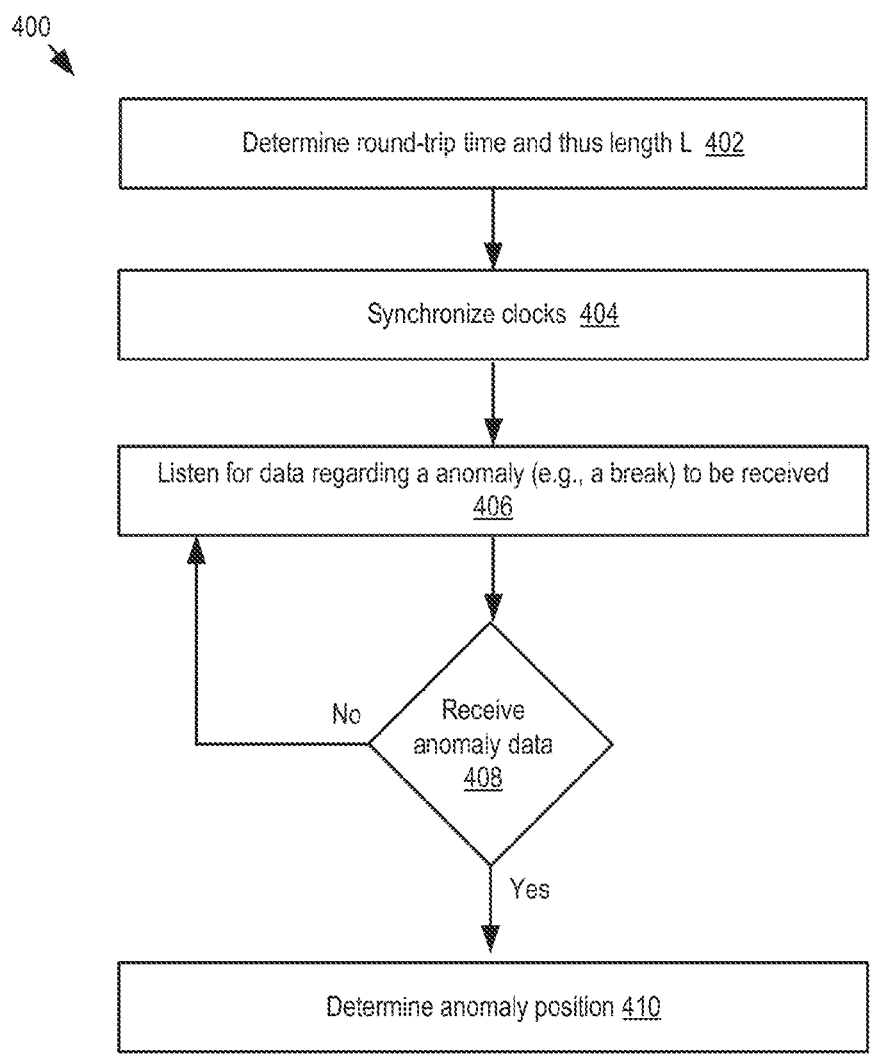
FIG. 4 illustrates a flow chart of an example operation for determining position of an anomaly in a fiber-optic network.

FIG. 4 illustrates a flow chart 400 of an example operation and determination of an anomaly position in a fiber length. A control module, such as network control plane 304 of FIG. 3, can perform the operation illustrated in flow chart 400. The operation illustrated by flow chart 400 may occur in combination with the operation illustrated by flow chart 200 in FIG. 2. For example, determining round-trip time and thus length L of a fiber optic span at 402 can occur via the operation illustrated by flow chart 200.

Figure 5:
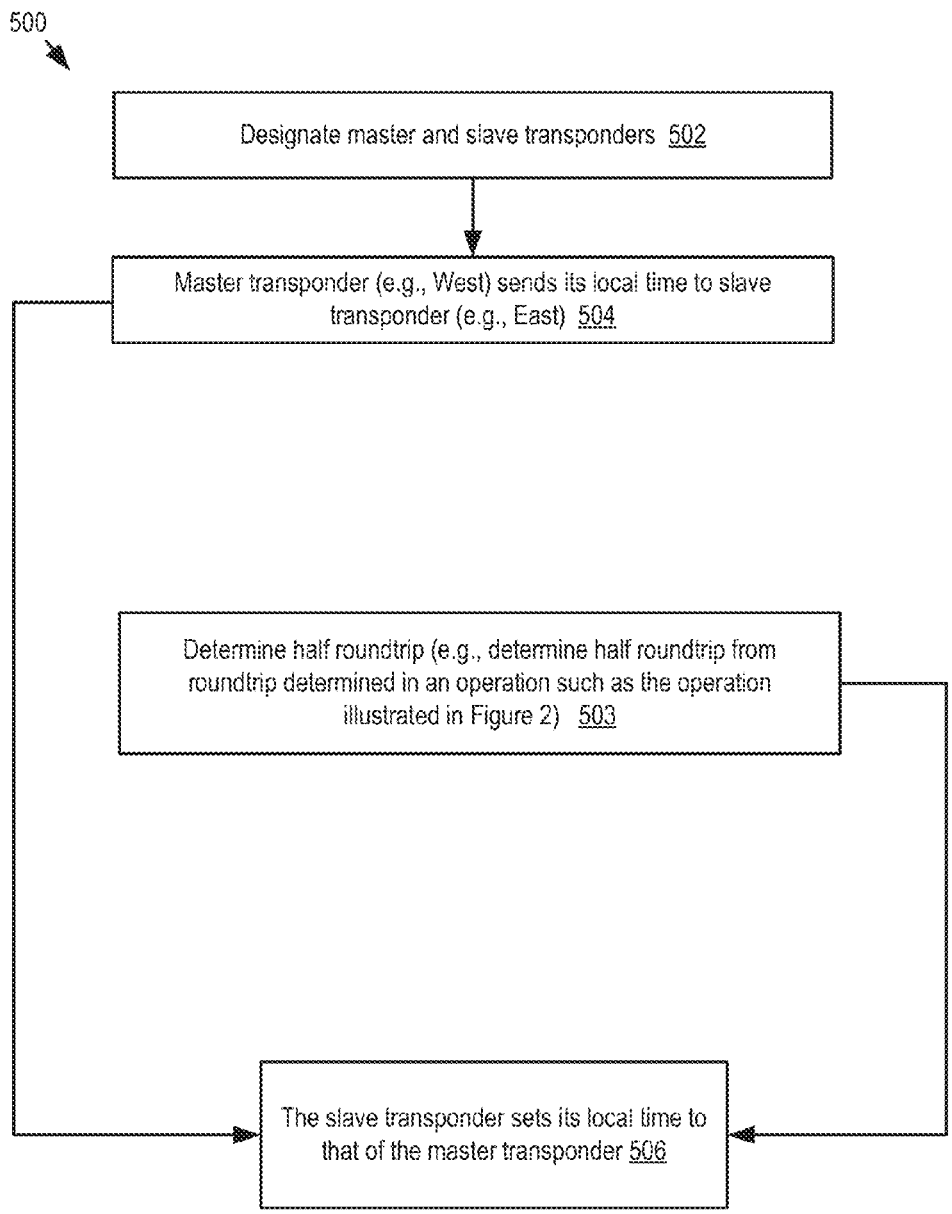
FIG. 5 illustrates a flow chart of an example clock synchronization operation that may occur at 404 of FIG. 4.

At 404, the control module synchronizes clocks of the transponders, such as transponders 106a and 106b. Also, in one example, in the determination of the round-trip time, the control module may synchronize respective clocks of the transponder, which allows the transponders to identify communications, such as markers, over the DCC. FIG. 5 illustrates a flow chart 500 of an example clock synchronization operation that may occur at 404.

As illustrated in FIG. 5, to determine synchronized absolute times, the control module may designate one of the transponders as a master and the other transponder as a slave at 502. The slave (e.g., transponder 106b or East) may synchronise its clock to the master (e.g., transponder 106a or West). In one example, after roundtrip time is determined, such as in the operation of FIG. 2, a half roundtrip ($t_{half}$) may be determined by the control module at 503. Given the half roundtrip, transmission latency can be corrected for by adding $t_{half}$ to the time provided by the master, for example. At 504, once the master and slave transponders are designated, the master transponder sends its local time to the slave transponder at 504. The slave transponder then may set its local time to that of the master transponder at 506. In one example, as illustrated in FIG. 5, the slave transponder can set a synchronized absolute time by adding $t_{half}$ to $t_{West\_Master}$, $t_{East\_slave} = t_{West\_Master} + t_{half}$.

After the clocks are synchronized, the control module listens for an anomaly at 406, such as data that represents a break in a cable. Where anomaly data is not received, the control module may continue to listen for such data. In other words, the control plane waits to receive the anomaly data. Where an anomaly is not identified, similar to flow chart 200, at 202, a first transponder, such as a transponder of node 106a, may set a marker, such as a bit, and sends the marker via the DCC to a second transponder, such as a transponder of node 106b, and so on.

At 408, the control module receives the anomaly data, such as via one of the transponders. In one example, the anomaly data is identified by the control module and timestamps the identification of the anomaly data via both the clocks. At 410, from the anomaly data and the absolute time-stamps, the control module, such as the network control plane 304, determines the anomaly position. The anomaly data may be as a result of a signal outage, such as a loss of client signal, clock, or channel. In one example, at least part of the anomaly data can be derived from or include a timestamp of the anomaly recorded by a transponder.

Not depicted, the FLMS may also perform similar determinations as the determinations illustrated in FIG. 2, but the second transponder initiates the determinations oppose to the first transponder. When such determinations are initiated by the second transponder, time stamping the identification of an anomaly is from the frame of reference of the second transponder. By identifying and time stamping the anomaly from the two perspectives of the first and the second transponder, validation of the location of the anomaly in the fiber length can be made by an aspect of the FLMS, such as the control module. With the disruption, such as a cable break, tracked from both directions by absolute timestamps, the control module may determine, using these time stamps, the total length between the two transponders as well.

In one example, the transponders, such as a first and a second transponder, know each other's half-round-trip time and have recorded the absolute outage time from any signal outage or failure event, such as a loss of signal, synchronization, or channel. For example, the first transponder (transponder West), such as a transponder of node 106a, may have logged the disruption as time $t_{West\_Break}$, and the second transponder (transponder East), such as a transponder of node 106b, may have logged the disruption as time $t_{East\_Break}$. Also, $t_{West\_Break}$ and $t_{East\_Break}$ may be synchronized absolute times.

Regarding the half roundtrip, $t_1 + t_2 = t_{half}$, where $t_1$ is the amount of time it takes for light to travel from the anomaly, such as cable break 302, to the first transponder (West), such as the transponder of node 106a, and $t_2$ is the amount of time it takes for light to travel from the anomaly to the second transponder (East), such as the transponder of node 106b. $t_1$ and $t_2$ and the total fiber length L between the two transponders may be determined at the control module. To clarify, if the break occurs at time t, the break will be identified at time $t_{East\_Break}$ at the East transponder and at time $t_{West\_Break}$ at the West transponder. Because $t_{West\_Break} = t + t_1$, $t_{East\_Break} = t + t_2$, and $t_{East\_Break} - t_{West\_Break} = 2t_1 - t_{half}$, the control module can calculate the distances from the anomaly to East and West transponders using $t_{East\_Break}$ and $t_{West\_Break}$.

The distance between the anomaly and West (or the first transponder) may be determined by the speed of light multiplied by the difference between $t_{West\_Break}$ and $t_{East\_Break}$, added to the length of the span from West to East, and divided by two, as shown in Formula (1).

$$L_1 = \frac{v \cdot (t_{West\_Break} - t_{East\_Break}) + L}{2} \quad (1)$$

where $L = L_1 + L_2$

Also, the distance between the anomaly and East (or the second transponder) may be determined by an analogous Formula (2). This distance can then be added and/or compared to the distance between the anomaly and the first transponder to see if the two distances add up to approximately the length of the span from the first transponder to the second transponder. Such a comparison may validate the determination of the distance between the first transponder and the anomaly.

$$L_2 = \frac{v \cdot (t_{East\_Break} - t_{West\_Break}) + L}{2} \quad (2)$$

where $L = L_1 + L_2$

Besides a break in a cable, other bi-directional detectable anomalies may be discovered by the FLMS. Also, the FLMS can use either $t_{East}$ or $t_{West}$ as a master or global timestamp, to determine the position of other anomalies, such as fast polarization transients. The fast polarization transients may cause a signal outage in a polarization multiplexed signal. Such anomalies may occur from a cable being perturbed, for example due to mechanical vibrations on a fiber or cable.

Polarization rotation data measured at a transceiver may be correlated with a timestamp and used to locate the position of such a perturbation using Formula 1 and/or Formula 2.

In addition, timestamps may be used to indicate that an outage or fast polarization change did not occur at the same time in both directions. This may be indicated by Formula 1 and/or Formula 2 indicating that the anomaly position is greater than the fiber length or less than zero.

The term "module" may be defined to include a plurality of executable modules. As described herein, modules, such as the control module of the FLMS, are defined to include software, hardware or some combination thereof, executable by a processor for example. Software modules may include instructions stored in memory (such as a computer readable storage media) that are executable by a processor. Hardware modules may include various devices, components, circuits, gates, circuit boards, and the like that are executable, directed, and/or controlled for performance by a processor. Furthermore, other aspects of the FLMS or a combination of aspects may be a module.

With respect to the above descriptions, various examples described herein can be used alone or in combination with one another. The foregoing detailed description has described only a few of the many possible implementations of the present examples. For this reason, this detailed description is intended by way of illustration, and not by way of limitation.

I claim:

1. A method comprising:
   measuring, at a processor, a length of one or more spans between a first optical transceiver and a second optical transceiver in a fiber-optic network, the length being determined from a round-trip delay measured from frames exchanged between the first and second optical transceivers in a frame structure of a service data communications channel, the frames being identifiable by the first and second optical transceivers from individual marker bits contained therein, wherein sending a first frame starts a round-trip timer and receipt of a second frame stops the round-trip timer such that an accuracy of the length measurement is dependent on a size of the frames;
   causing a clock of the second optical transceiver to be synchronized to a clock of the first optical transceiver based on a one-way time delay corresponding to the length determination; and
   determining, at the processor, a location of an anomaly along the one or more spans of fiber optic cable based on a difference in a first timestamp of the anomaly recorded at the first optical transceiver and a second timestamp of the anomaly recorded at the second optical transceiver.

2. The method of claim 1, wherein the measuring, causing, and determining steps are carried out by the processor of a control module.

3. The method of claim 2, wherein the control module is in communication with at least one of the first and second optical transceivers.

4. The method of claim 2, wherein the control module is a network control plane.

5. The method of claim 1, further comprising fine-tuning the accuracy of the length measurement by adjusting the size of the frame structure.

6. The method of claim 5, wherein adjusting the size of the frame to 5 µs results in a 2 km inaccuracy in the length measurement.

7. A method comprising:
   generating at a first optical transceiver a first frame in a frame structure of a service data communications channel, the first frame containing a first marker bit identifying the first frame as a round-trip delay measurement frame;
   transmitting the first frame to a second optical transceiver via one or more spans in a fiber optic network;
   starting a timer at the first optical transceiver upon the transmitting of the first frame;
   receiving at the first optical transceiver a second frame transmitted by the second optical transceiver in the frame structure of the service data communications channel in response to receipt of the first frame, the second frame containing a second marker bit identifying the second frame as a round-trip delay measurement frame,
   stopping the timer at the first optical transceiver upon the receiving of the second frame;
   determining a length of the one or more spans based on a time period defined by the starting to the stopping of the timer, wherein an accuracy of the determining of the length is dependent on a size of the frame structure;
   designating the first optical transceiver as a master and the second optical transceiver as a slave;
   causing the second optical transceiver to synchronize its clock to a clock of the first optical transceiver based on a one-way time delay corresponding to the length determination; and
   determining a location of an anomaly along the one or more spans of the fiber optic network based on a difference in a first timestamp of the anomaly recorded at the first optical transceiver and a second timestamp of the anomaly recorded at the second optical transceiver.

8. The method of claim 7, further comprising receiving data associated with an anomaly via the first or second transceivers.

9. The method of claim 7, wherein the anomaly is one or more of a loss of signal, a loss of channel, or a loss of clock.

10. The method of claim 7, wherein the anomaly is one or more of an amplitude change, a polarization change, or a phase shift.

11. The method of claim 7, wherein the anomaly is associated with a perturbation in the one or more spans.

12. The method of claim 11, wherein the perturbation is a break in a cable fiber.

13. The method of claim 11, wherein the perturbation is a power outage at a node in the one or more spans.

14. A system comprising:
   a first optical transceiver;
   a second optical transceiver; and
   a control module, the control module comprising:
      a processor; and
      memory, wherein the memory includes:
      instructions executable by the processor to measure a length of one or more spans between a first optical transceiver and a second optical transceiver in a fiber-optic network, the length being determined from a round-trip delay measured from the length being determined from a round-trip delay measured from frames exchanged between the first and second optical transceivers in a frame structure of a service data communications channel, the frames being identifiable by the first and second optical transceivers from individual marker bits contained therein, wherein sending a first frame starts a round-trip timer and receipt of a second frame stops the round-trip timer such that an accuracy of the length measurement is dependent on a size of the frames;

instructions executable by the processor to synchronize a clock of the second optical transceiver to a clock of the first optical transceiver based on a one-way time delay corresponding to the length determination; and instructions executable by the processor to determine a location of an anomaly along the one or more spans of fiber optic cable based on a difference in a first timestamp of the anomaly recorded at the first optical transceiver and a second timestamp of the anomaly recorded at the second optical transceiver.

15. The system of claim 14, wherein the control module is in communication with at least one of the first and second optical transceivers.

16. The system of claim 14, wherein the control module is a network control plane.

17. The system of claim 14, further comprising instructions executable by the processor to fine-tune the accuracy of the length measurement by adjusting the size of the frame.

18. The system of claim 17, wherein adjusting the size of the frame structure to 5 μs results in a 2 km inaccuracy in the length measurement.

* * * * *